United States Patent
Lin

(10) Patent No.: US 8,491,198 B2
(45) Date of Patent: Jul. 23, 2013

(54) OPTICAL FIBER ADAPTER WITH SHUTTER MEMBER

(75) Inventor: I En Lin, Taipei (TW)

(73) Assignee: Protai Photonic Co., Ltd., New Taipei (TW)

(*) Notice: Subject to any disclaimer, the term of this patent is extended or adjusted under 35 U.S.C. 154(b) by 147 days.

(21) Appl. No.: 13/217,354

(22) Filed: Aug. 25, 2011

(65) Prior Publication Data

US 2012/0251050 A1 Oct. 4, 2012

(30) Foreign Application Priority Data

Mar. 30, 2011 (TW) .............................. 10110921 A

(51) Int. Cl.
*G02B 6/36* (2006.01)

(52) U.S. Cl.
USPC ........................................................... 385/75

(58) Field of Classification Search
USPC ......................................................... 385/75
See application file for complete search history.

(56) References Cited

U.S. PATENT DOCUMENTS

| 2004/0062486 | A1 | 4/2004 | Tanaka et al. |
| 2007/0098330 | A1* | 5/2007 | Ozawa et al. ................... 385/76 |
| 2007/0230874 | A1 | 10/2007 | Lin |
| 2009/0226141 | A1 | 9/2009 | Lin et al. |

FOREIGN PATENT DOCUMENTS

JP 2008-225133 A 9/2008

* cited by examiner

*Primary Examiner* — Jerry Rahll
(74) *Attorney, Agent, or Firm* — Lowe Hauptman Ham & Berner, LLP

(57) ABSTRACT

An optical fiber adapter according to the present disclosure includes a main body, two inner housings, a cover plate and an elastic shutter member. The main body has an axial accommodation room defined by a first wall, a second wall, a third wall and a fourth wall, wherein the first wall faces the third wall and connects with the second and fourth walls. The accommodation room has a first opening and a second opening opposing to the first opening. An access opening is provided on the first wall for the inner housings to place within the accommodation room. The cover plate is positioned to cover the access opening on the first wall. The shutter member includes a fixing portion, at least one first hook, a shutter plate and a connecting portion. The fixing portion is positioned on the cover plate and within the accommodation room. The first hook is provided at the fixing portion for the fixing portion to be fixed on the cover plate. The connecting portion connects the fixing portion with the shutter plate. The shutter plate extends from the connecting portion and is positioned within the accommodation room.

14 Claims, 7 Drawing Sheets

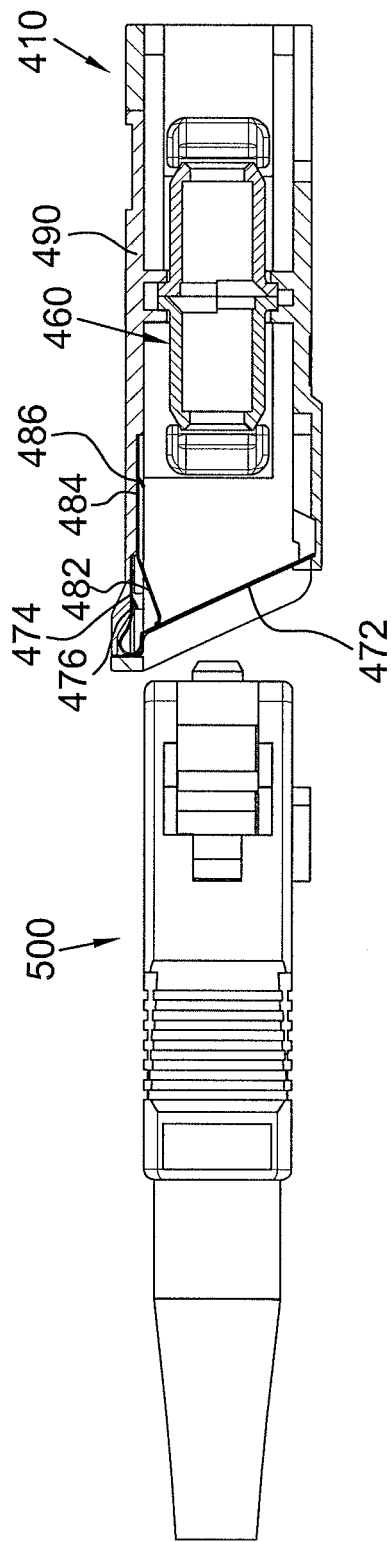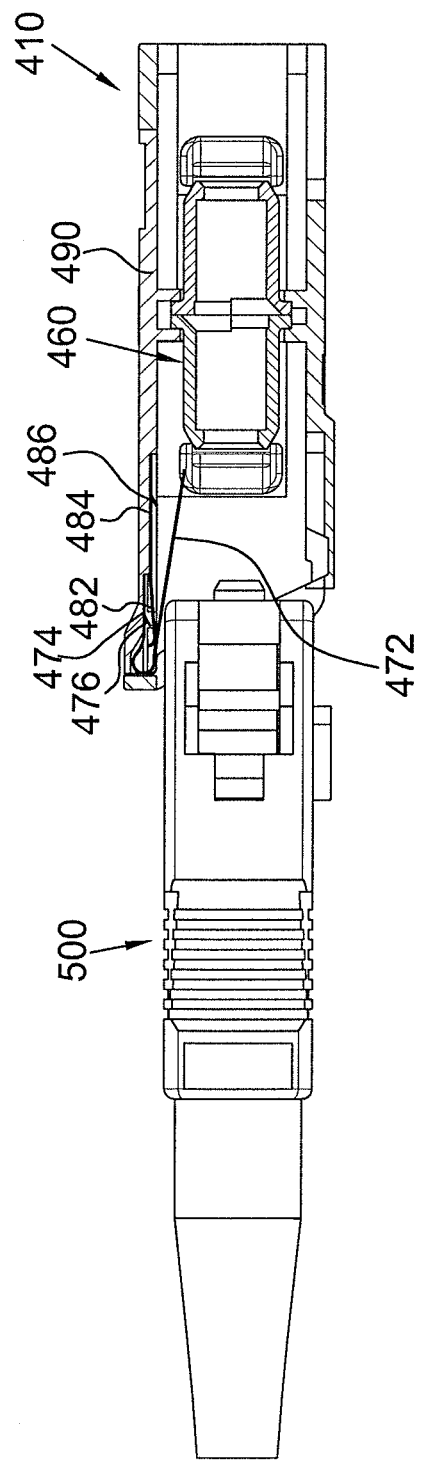

OPTICAL FIBER ADAPTER WITH SHUTTER MEMBER

CROSS REFERENCE TO RELATED APPLICATION

This application claims the priority benefit of Taiwan Patent Application Serial Number 100110921 filed Mar. 30, 2011, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY OF THE INVENTION

The present disclosure provides a shutter member for an optical fiber adapter that may obstruct the light beams emitted from the accommodation room thereby preventing the eyes from exposure to the harmful light beams.

In one embodiment, the optical fiber adapter of the present disclosure includes a main body, two inner housings, a cover plate and an elastic shutter member. The main body has an axial accommodation room defined by a first wall, a second wall, a third wall and a fourth wall, wherein the first wall faces the third wall and connects with the second and fourth walls. The accommodation room has a first opening and a second opening opposing to the first opening. An access opening is provided on the first wall for the inner housings to place within the accommodation room. The cover plate is positioned to cover the access opening on the first wall. The shutter member includes a fixing portion, at least one first hook, a shutter plate and a connecting portion. The fixing portion is positioned on the cover plate and within the accommodation room. The first hook is provided at the fixing portion for the fixing portion to be fixed on the cover plate. The connecting portion connects the fixing portion with the shutter plate. The shutter plate extends from the connecting portion and is positioned within the accommodation room.

The foregoing, as well as additional objects, features and advantages of the disclosure will be more readily apparent from the following detailed description, which proceeds with reference to the accompanying drawings.

BRIEF DESCRIPTION OF THE DRAWINGS

FIGS. 10 and 11 illustrate how to mate an optical fiber connector with the optical fiber adapter of the present disclosure.

DETAILED DESCRIPTION OF THE PREFERRED EMBODIMENT

Figure 1:
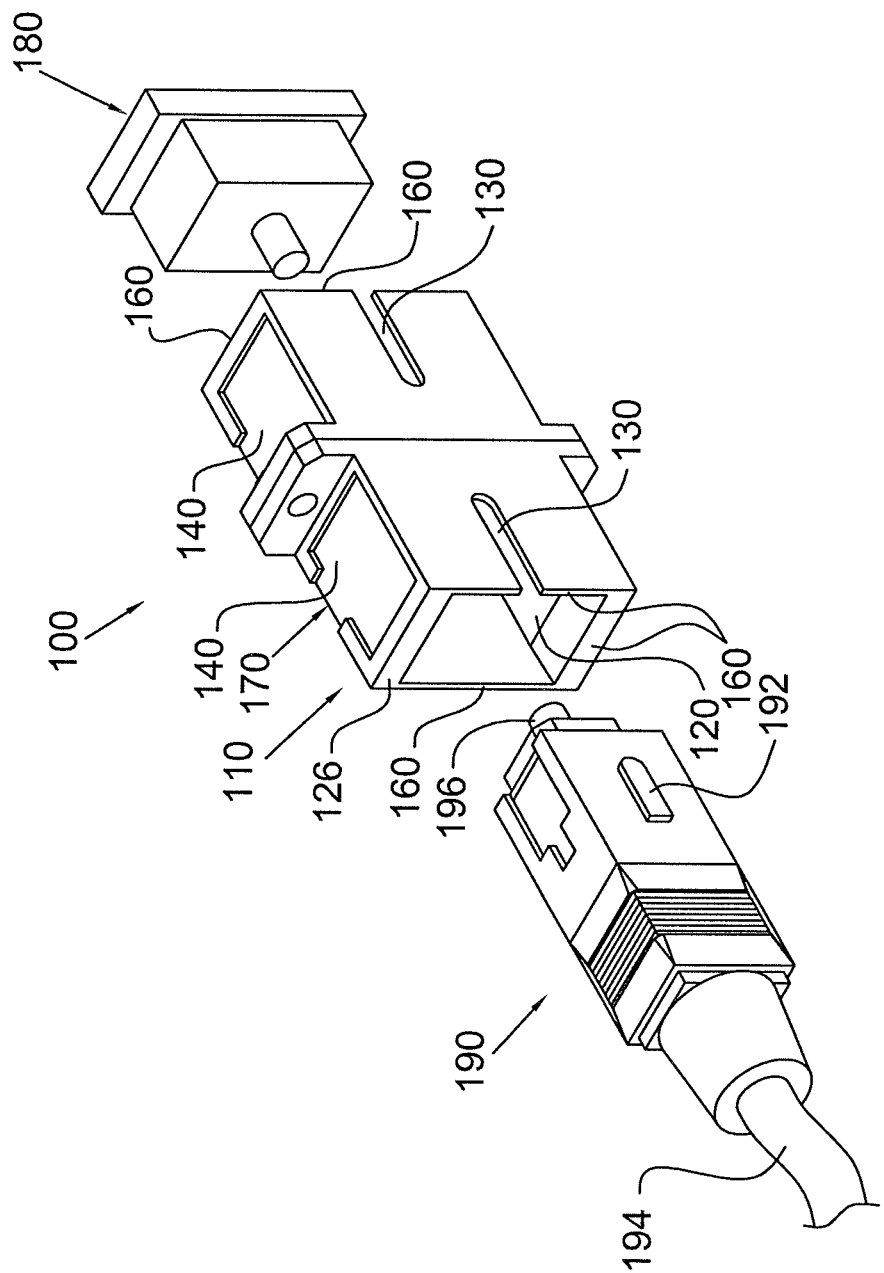
FIG. 1 is an elevated perspective view illustrating a conventional optical fiber adapter and a conventional optical fiber connector.
Figure 2:
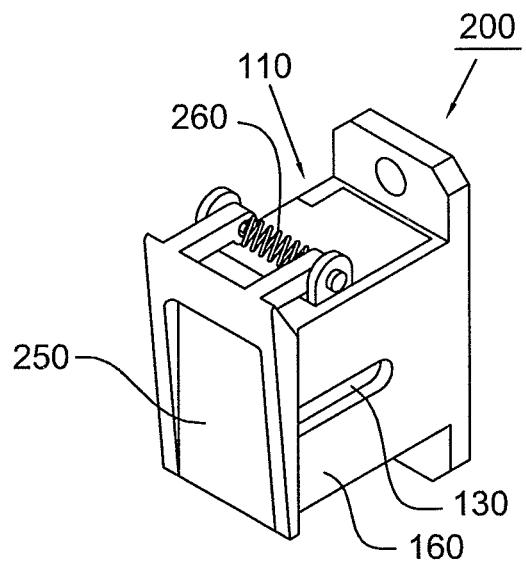
FIG. 2 is an elevated perspective view of a conventional optical fiber adapter with a cover for obstructing the light beams emitted from the receiving recess.
Figure 3:
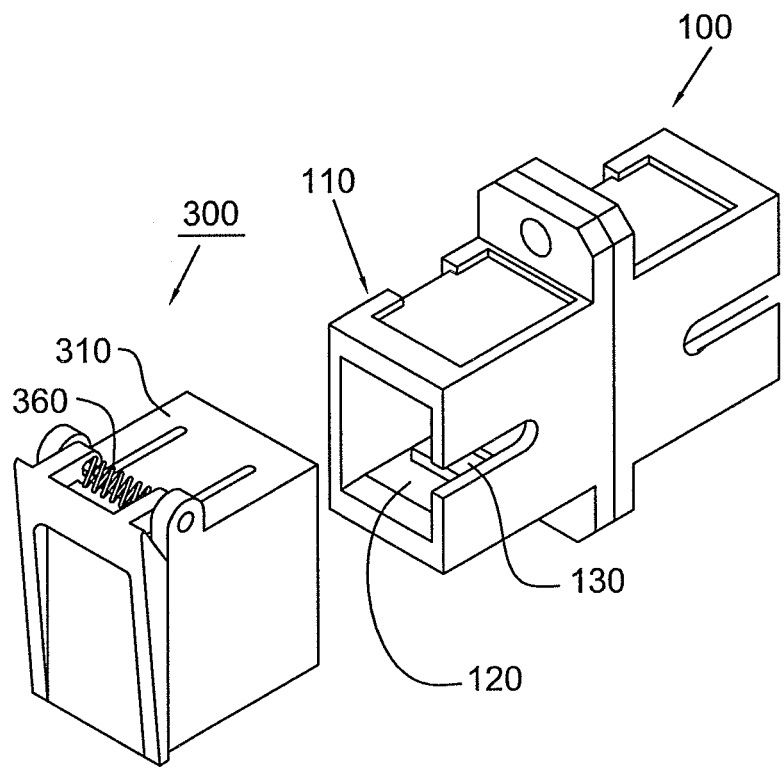
FIG. 3 is an elevated perspective view of a conventional protection cap for an optical fiber adapter.
Figure 4:
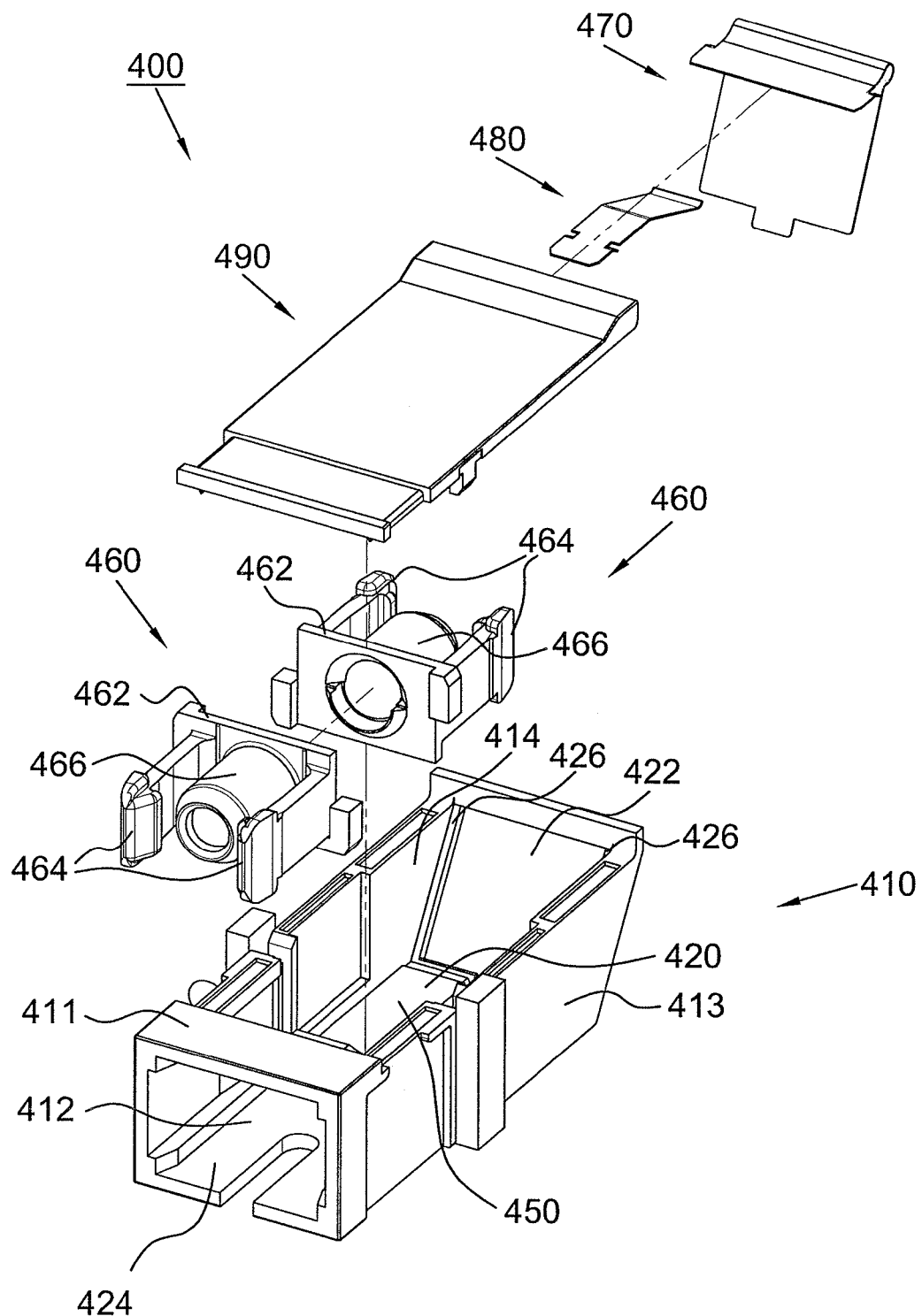
FIG. 4 is an exploded view of the optical fiber adapter according to the present disclosure.

Referring to FIG. 4, the optical fiber adapter 400 according to the present disclosure includes a unitary molded main body 410, a pair of inner housings 460, an elastic shutter member 470, an auxiliary elastic sheet 480 and a plastic cover plate 490. The main body 410 has an axial accommodation room 420 defined by a top side-wall 411, a bottom side-wall 412, a right side-wall 413 and a left side-wall 414. The accommodation room 420 has opposing first and second openings 422, 424, wherein the first opening 422 is an inclined opening. Two elongated protrusions 426 are formed on the edges of the right and left side-walls 413, 414, respectively and adjacent to the first opening 422. The two protrusions 426 are parallel to each other and the distance between the protrusions 426 is smaller than the width of the axial accommodation room 420.

An access opening 450 is located on the top side-wall 411. The access opening 450 allows the inner housings 460 to be placed within the axial accommodation room 420 of the main body 410. The each inner housing 460 is provided with a pair of hooks 464 extending from one end of a generally rectangular flange 462. The flange 462 includes a hollow cylinder 466 located between the two hooks 464.

Figure 5:
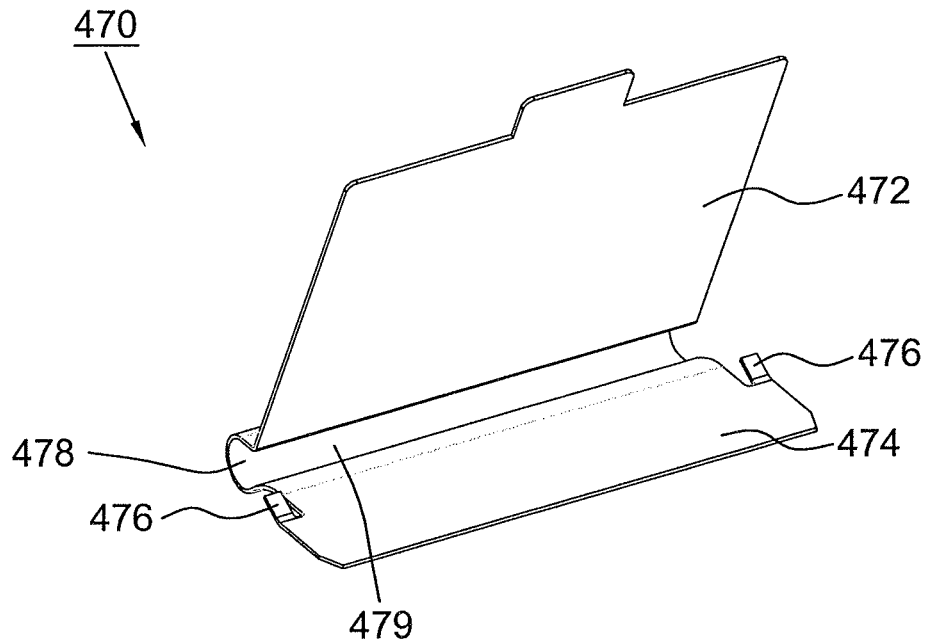
FIG. 5 is an elevated perspective view of the shutter member of the optical fiber adapter according to the present disclosure.

Referring to FIG. 5, the elastic shutter member 470 is integrally formed and made of metal. The shutter member 470 includes a shutter plate 472, a fixing portion 474 and a connecting portion 478 connecting the fixing portion 474 with the shutter plate 472. The connecting portion 478 is generally C-shaped. That is, the connecting portion 478 is curved and has a notch 479. The shutter plate 472 and fixing portion 474 both have plate-like shapes, wherein the width of the shutter plate 472 is smaller than that of the axial accommodation room 420 but is greater than the distance between the protrusions 426. The shutter plate 472 may move with respect to the fixing portion 474 and the angle between the above two elements is smaller than 90 degrees. The shutter plate 472 is moved close to the fixing portion 474 with a push force and quickly moves back when the push vanishes. Two hooks 476 are provided at the two opposing sides of the fixing portion 474, respectively.

Figure 6:
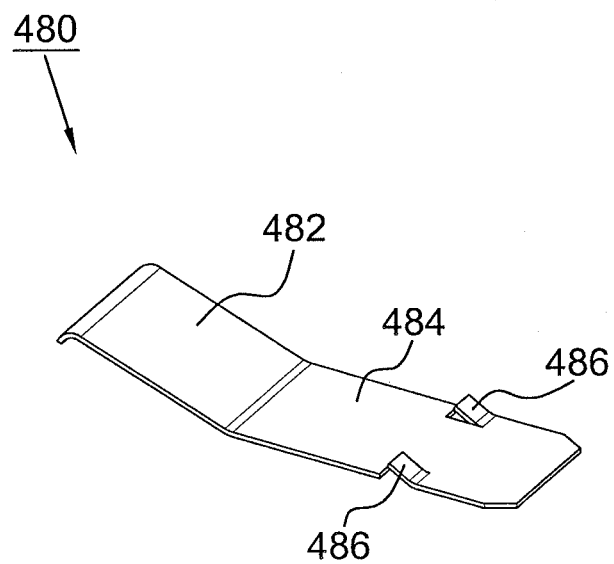
FIG. 6 is an elevated perspective view of the auxiliary elastic sheet of the optical fiber adapter according to the present disclosure.

Referring to FIG. 6, the auxiliary elastic sheet 480 is integrally formed and made of metal. The auxiliary elastic sheet 480 includes a fixing portion 484 connecting with a supporting portion 482. The supporting portion 482 may move with respect to the fixing portion 484 and the angle between the above two elements is greater than 90 degrees. Two hooks 486 are provided at the two opposing sides of the fixing portion 484, respectively.

Figure 7:
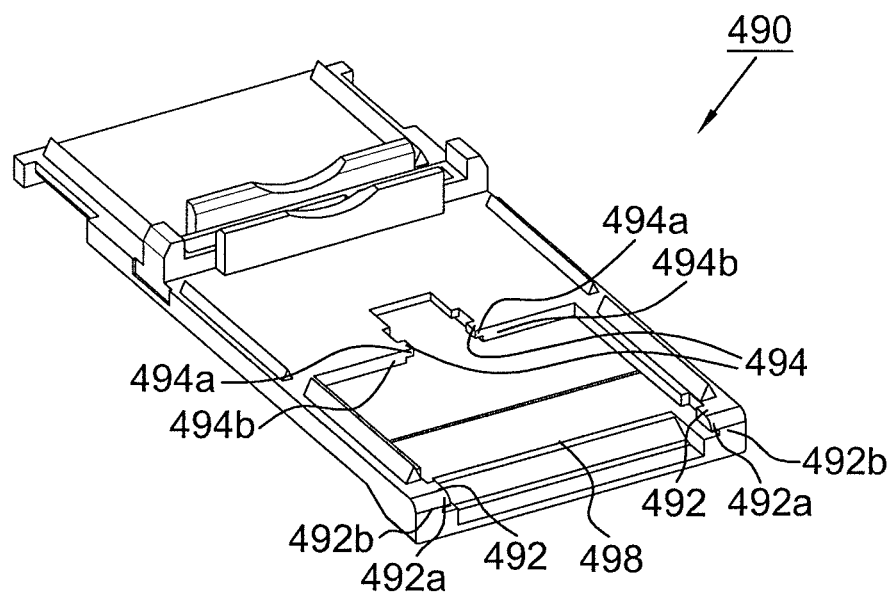
FIG. 7 is an elevated perspective view of the cover plate of the optical fiber adapter according to the present disclosure.

Referring to FIG. 7, two pairs of protrusions 492, 494 are provided on the surface 498 of the cover plate 490, wherein the protrusions 492 are adjacent to the edge of the cover plate 490. The protrusions 492 and 494 substantially have inverted L shapes. Specifically, each the protrusion 492 includes a vertical portion 492b connecting with a horizontal portion 492a, wherein the vertical portion 492b is fixed on and vertically extends from the surface 498 of the cover plate 490 and the horizontal portion 492a horizontally extends from the top of the vertical portion 492b. Therefore, a clear gap is formed between the horizontal portion 492a and the surface 498 of the cove plate 490. Similarly, each the protrusion 494 includes a vertical portion 494b connecting with a horizontal portion 494a, wherein the vertical portion 494b is fixed on and vertically extends from the surface 498 of the cover plate 490 and the horizontal portion 494a horizontally extends from the top of the vertical portion 494b. Therefore, a clear gap is formed between the horizontal portion 494a and the surface 498 of the cove plate 490.

Figure 8:
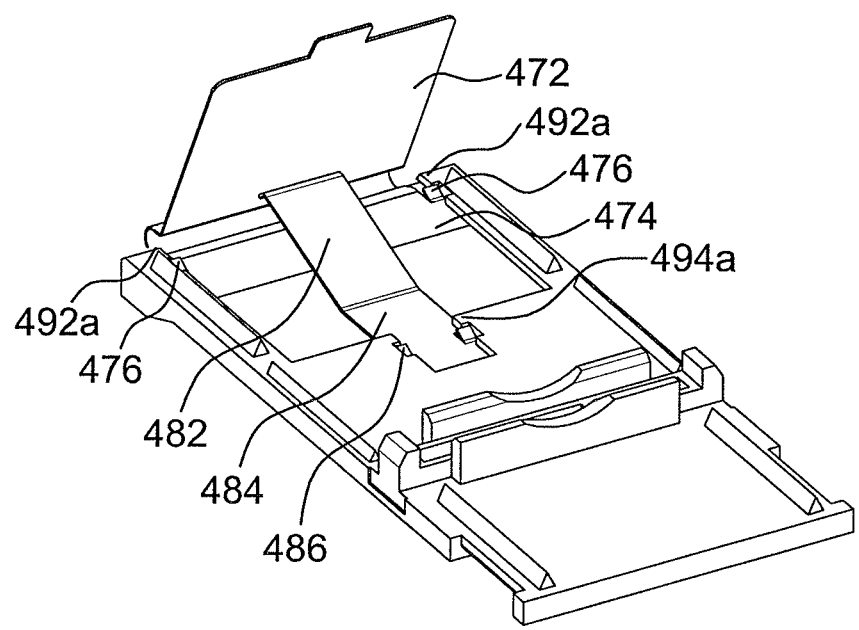
FIG. 8 is an elevated perspective view illustrating that the shutter member of FIG. 5 and the auxiliary elastic sheet of FIG. 6 are attached to the cover plate of FIG. 7.

Referring to FIG. 8, when desiring to attach the shutter member 470 and auxiliary elastic sheet 480 to the cover plate 490, the fixing portion 484 of the auxiliary elastic sheet 480 is first placed between the protrusions 494. Afterward, the fixing portion 484 is pushed parallel to the surface of the cover plate 490. When the fixing portion 484 is continued to move, the hooks 486 of the auxiliary elastic sheet 480 will be pressed by the horizontal portions 494a of the protrusions 494. After the hooks 486 pass the horizontal portions 494a, the hooks 486 will spring up to original positions. In case a pull force is exerted on the auxiliary elastic sheet 480, the hooks 486 will be brought into contact with the horizontal portions 494a of the protrusions 494 to prevent the fixing portion 484 from being pulled out of the cover plate 490. In addition, the edges of the fixing portion 484 will be positioned under the horizontal portions 494a. This can prevent the fixing portion 484 from being pulled upward from the cover plate 490.

After the auxiliary elastic sheet 480 is attached to the cover plate 490, the fixing portion 474 of the shutter member 470 is then placed between the protrusions 492. Subsequently, the fixing portion 474 is pushed parallel to the surface of the cover plate 490. When the fixing portion 474 is continued to move, the hooks 476 of the shutter member 470 will be pressed by the horizontal portions 492a of the protrusions 492. After the hooks 476 pass the horizontal portions 492a, the hooks 476 will spring up to original positions. In case a pull force is exerted on the shutter member 470, the hooks 476 will be brought into contact with the horizontal portions 492a of the protrusions 492 to prevent the fixing portion 474 from being pulled out of the cover plate 490. In addition, the edges of the fixing portion 474 will be positioned under the horizontal portions 492a. This can prevent the fixing portion 474 from being pulled upward from the cover plate 490. When the shutter member 470 is placed on the cover plate 490 in position, the supporting portion 482 of the auxiliary elastic sheet 480 will be in contact with the shutter plate 472 of the shutter member 470.

When desiring to assemble the optical fiber adapter 400, the inner housings 460 are inserted into the axial accommodation room 420 through the access opening 450. Afterward, the cover plate 490 attached with the shutter member 470 and auxiliary elastic sheet 480 is brought to cover the access opening 450 and is bonded to the main body 410 by ultrasonic welding.

Figure 9:
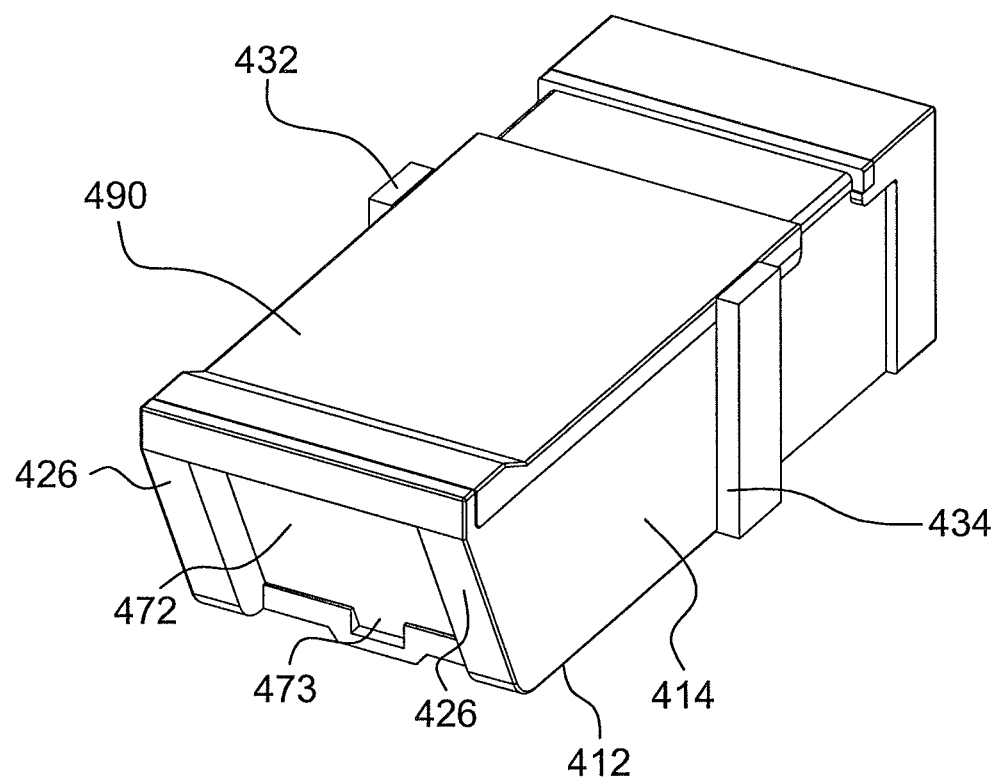
FIG. 9 is an elevated perspective view of the optical fiber adapter according to the present disclosure.

Referring to FIG. 9, when the shutter member 470 is placed within the axial accommodation room 420, the shutter plate 472 of the shutter member 470 will cover the opening 422 of the axial accommodation room 420. This way the light beams emitted from the hollow cylinder 466 may be obstructed thereby preventing a user's eyes from exposure to the harmful light beams. In addition, because the width of the shutter plate 472 is greater than the distance between the two protrusions 426, the edges of the shutter plate 472 may be in tight contact with the protrusions 426. This way the opening 422 may be closed to prevent dust or contaminant from entering the axial accommodation room 420.

Referring to FIGS. 10 and 11, according to the optical fiber adapter 400 of the present disclosure, there is no need to detach the shutter member 470 and auxiliary elastic sheet 480 from the main body 410 prior to inserting an optical fiber connector 500 into the main body 410. When the connector 500 is inserted into the main body 410, it will push down the elastic shutter plate 472 and auxiliary elastic sheet 480 to the gap between the connector 500 and the bottom side-wall 412 of the main body 410. Upon pulling out the connector 500, the elastic shutter plate 472 will quickly spring up to an original position to obstruct the light beams emitted from the cylinder 466 as a result of elasticity. As a result, the occurrence of exposure to the harmful light beams can be avoided. Moreover, since the auxiliary elastic sheet 480 will also spring up when the connector 500 is pulled out, the supporting portion 482 of the auxiliary elastic sheet 480 may push the shutter plate 472 toward an original position of the shutter plate 472.

Although the present disclose has been explained in detailed with SC type optical fiber adapter, it will be appreciated that the optical fiber adapter of the present disclosure may include other types of adapters. In addition, it will be appreciated that although the disclosure has been explained with the simplex adapter, the shutter member of the present disclosure can be used in duplex or other types of adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
    a main body having an accommodation room defined by a first wall, a second wall, a third wall and a fourth wall, the first wall facing the third wall and connecting with the second and fourth walls, wherein the accommodation room has a first opening opposing to a second opening, and an access opening is formed on the first wall;
    two inner housings positioned within the accommodation room;
    a cover plate positioned to cover the access opening on the first wall; and
    an elastic shutter member including:
        a fixing portion positioned on the cover plate and within the accommodation room;
        at least one first hook provided at the fixing portion for the fixing portion to be fixed on the cover plate;
        a shutter plate; and
        a connecting portion connecting the fixing portion with the shutter plate;
        wherein the shutter plate extends from the connecting portion into the accommodation room.

2. The optical fiber adapter as claimed in claim 1, wherein at least one first protrusion is formed on the cover plate, the first hook is in contact with the first protrusion for the fixing portion to be fixed on the cover plate.

3. The optical fiber adapter as claimed in claim 2, wherein the first protrusion has a first vertical portion and a first horizontal portion, the first vertical portion extends from the cover plate, the first horizontal portion extends from the first vertical portion, and wherein the first hook is in contact with the first horizontal portion.

4. The optical fiber adapter as claimed in claim 3, wherein the elastic shutter member has two first hooks and two first protrusions are formed on the cover plate, and wherein the first hooks are provided at two opposing sides of the fixing portion, respectively.

5. The optical fiber adapter as claimed in claim 1, wherein two first protrusions are formed on the cover plate, each the first protrusion has a first vertical portion and a first horizontal portion, the first vertical portion extends from the cover plate, the first horizontal portion extends from the first vertical portion, and wherein a gap is formed between the first horizontal portion and the cover plate, an edge of the fixing portion is positioned within the gap.

6. The optical fiber adapter as claimed in claim 1, further comprising:
    two protrusions formed on the second and fourth walls respectively and being adjacent to the first opening;
    wherein the shutter plate is in contact with the two protrusions.

7. The optical fiber adapter as claimed in claim 1, further comprising:
    an auxiliary elastic sheet positioned within the accommodation room, the auxiliary elastic sheet including:
        a fixing portion positioned on the cover plate;
        two second hooks provided at two opposing sides of the fixing portion of the auxiliary elastic sheet for the fixing portion of the auxiliary elastic sheet to be fixed on the cover plate; and
    a supporting portion connecting with the fixing portion of the auxiliary elastic sheet, wherein the supporting portion is configured to push the shutter plate toward an original position of the elastic shutter plate.

8. The optical fiber adapter as claimed in claim 7, wherein two second protrusion are formed on the cover plate, the second hooks are in contact with the second protrusions respectively for the fixing portion of the auxiliary elastic sheet to be fixed on the cover plate.

9. The optical fiber adapter as claimed in claim 8, wherein each the second protrusion has a second vertical portion and a second horizontal portion, the second vertical portion extends from the cover plate, the second horizontal portion extends from the second vertical portion, and wherein the second hooks are in contact with the second horizontal portions.

10. The optical fiber adapter as claimed in claim 7, wherein two second protrusions are formed on the cover plate, each the second protrusion has a second vertical portion and a second horizontal portion, the second vertical portion extends from the cover plate, the second horizontal portion extends from the second vertical portion, and wherein a gap is formed between the second horizontal portion and the cover plate, an edge of the fixing portion of the auxiliary elastic sheet is positioned within the gap.

11. The optical fiber adapter as claimed in claim 1, wherein the connecting portion has a C shape.

12. The optical fiber adapter as claimed in claim 1, wherein the shutter plate has a plate-like shape.

13. The optical fiber adapter as claimed in claim 1, wherein the fixing portion of the shutter member has a plate-like shape.

14. The shutter member as claimed in claim 1, wherein the shutter member is integrally formed and made of metal.

\* \* \* \* \*